United States Patent [19]
Pippel et al.

[11] Patent Number: 5,800,583
[45] Date of Patent: Sep. 1, 1998

[54] AIR TREATMENT SYSTEM

[75] Inventors: Bradley J. Pippel, Grandville, Mich.;
Dale Aberegg, New Albany, Ohio

[73] Assignee: Amway Corporation, Ada, Mich.

[21] Appl. No.: 661,589

[22] Filed: Jun. 11, 1996

[51] Int. Cl.$^6$ .................................................. B01D 46/000
[52] U.S. Cl. .................... 55/467; 96/424; 248/225.11; 248/207
[58] Field of Search .................... 55/472, 490, 495, 55/467, 274, 271; 248/207, 220.21, 225.11

[56] References Cited

U.S. PATENT DOCUMENTS

| | | |
|---|---|---|
| D. 300,847 | 4/1989 | Lin . |
| D. 305,929 | 2/1990 | Ikeda et al. . |
| D. 308,414 | 6/1990 | Makihara . |
| D. 323,210 | 1/1992 | Wortham . |
| D. 324,419 | 3/1992 | Kanazawa . |
| D. 338,709 | 8/1993 | Lin . |
| 3,618,014 | 11/1971 | Ljungkull .................... 340/112 |
| 3,672,622 | 6/1972 | Breslow .................... 248/224 |
| 3,861,894 | 1/1975 | Marsh . |
| 3,928,008 | 12/1975 | Petersen . |
| 4,165,852 | 8/1979 | Chervenak .................... 248/225.11 |
| 4,370,155 | 1/1983 | Armbruster . |
| 4,385,911 | 5/1983 | Popeil et al. . |
| 4,585,199 | 4/1986 | Chap .................... 248/225.11 |
| 4,701,195 | 10/1987 | Rosendall . |
| 4,737,173 | 4/1988 | Kudirka et al. . |
| 4,785,295 | 11/1988 | Newman et al. .................... 55/270 |
| 4,894,071 | 1/1990 | Klein . |
| 4,900,344 | 2/1990 | Lansing . |
| 4,917,713 | 4/1990 | Helmus . |
| 4,977,853 | 12/1990 | Huang . |
| 5,087,004 | 2/1992 | Lundell et al. . |
| 5,139,546 | 8/1992 | Novobilski . |
| 5,167,681 | 12/1992 | O'Keefe et al. . |
| 5,240,478 | 8/1993 | Messina .................... 55/279 |
| 5,290,330 | 3/1994 | Tepper et al. . |
| 5,299,634 | 4/1994 | Toyoda et al. . |

FOREIGN PATENT DOCUMENTS

| | | | |
|---|---|---|---|
| 59-217431 | 12/1984 | Japan | ................... 1/2 |
| 62-66748 | 4/1987 | Japan . | |
| 63-38842 | 2/1988 | Japan . | |
| 6427611 | 1/1989 | Japan . | |
| 266213 | 5/1990 | Japan . | |
| 332922 | 3/1991 | Japan . | |
| 3-254808 | 11/1991 | Japan | ................... 55/495 |

(List continued on next page.)

OTHER PUBLICATIONS

Patent Abstracts of Japan vol. 017, No. 671 (M–1525), 10 Dec. 1993 & JP 05 223089, 31 Aug. 1993.
Patent Abstracts of Japan vol. 016, No. 517 (E–1284), 23 Oct. 1992 & JP 04 192793, 10 Jul. 1992.
Patent Abstracts of Japan vol. 096, No. 004, 30 Apr. 1996 & JP 07 318148, 8 Dec. 1995.
Patent Abstracts of Japan vol. 012, No. 261 (E–636), 22 Jul. 1988 & JP 63 045929, 26 Feb. 1988.

*Primary Examiner*—Jay H. Woo
*Assistant Examiner*—Robert Hopkins
*Attorney, Agent, or Firm*—Warner Norcross & Judd

[57] ABSTRACT

An air treatment system having a relatively large capacity yet a relatively small footprint and low sound level. The air treatment system includes a housing defining adjacent vertically extending inlet and outlet chambers. A blower is mounted within the inlet chamber to move air through the system. A generally planar filter is contained within the outlet chamber and is spaced apart from the rear wall of the housing to define a plenum. The rear wall of the housing is curved so that the plenum is tapered to provide uniform pressure over the face of the filter. The system is adapted to rest upon the floor or mount either vertically or horizontal to a wall. Additionally, the system includes a control mechanism that allows the system to run at full speed for a predetermined period of time and then automatically return to its previous speed level.

17 Claims, 6 Drawing Sheets

FOREIGN PATENT DOCUMENTS

| | | |
|---|---|---|
| 4-192793 | 7/1992 | Japan . |
| 4190816 | 7/1992 | Japan . |
| 4192793 | 7/1992 | Japan . |
| 549021 | 6/1993 | Japan . |
| 5229338 | 9/1993 | Japan . |
| 5319089 | 12/1993 | Japan . |
| 6262020 | 9/1994 | Japan . |
| 2181337 | 4/1987 | United Kingdom . |

AIR TREATMENT SYSTEM

BACKGROUND OF THE INVENTION

The present invention relates to air treatment systems, and more particularly to a portable room air filtering system.

Air treatment systems have grown in popularity in recent years. A growing concern for health and an increased recognition of the risks associated with unclear air are largely responsible for this trend. For example, airborne pollutants can cause or contribute to a number of respiratory problems, including respiratory infections, asthma, and allergies. Additionally, some airborne pollutants can cause undesirable odors. While air treatment systems are available in a wide variety of designs, a conventional air treatment system includes a blower that moves air through a filter element. The blower and filter element are typically contained in a unitary housing and are arranged with the blower either drawing or pushing air through the filter element. A number of different filter elements with different filtering characteristics are commercially available. For example, particulate filters are available to remove particulate matter from air. A conventional particulate filter includes a substance, such as fiberglass or electret-type media, that traps particulate matter as air is passed therethrough. Another example, odor filters are available to remove odors from the air. A conventional odor filter includes activated carbon, or activated charcoal, which removes pollutants from the air primarily by adsorption.

Conventional air treatment systems suffer from a number of problems. First, the systems are inherently noisy. The sound of air moving through the system and the noise generated by the blower motor are primary contributors to the noise level of the system. The noise level of the blower can be reduced by utilizing a quieter motor. However, quieter motors typically increase the cost of the system. The noise level of the moving air can be reduced by lowering the velocity at which it moves through the system. This can be done by increasing the size of the air flow path or by lowering the volume of air moved through the system. Larger air flow paths require larger housings and therefore increase the overall size of the system. Lower air volumes can reduce the overall effectiveness of the system. Second, conventional air treatment systems are often difficult to incorporate into the home or office. To obtain acceptable treatment capacity, air treatment systems are typically relatively large. Due to their size, it is often difficult to find room for an air treatment system. In some rooms, it is desirable for the system to rest upon the floor and in others it is desirable for system to mount to the wall. Conventional systems do not have the ability to meet both of these desires. Third, filter elements require periodic replacement. Consumers often forget when it is time to replace the filter and may find it difficult to replace the filter when they do remember.

SUMMARY OF THE INVENTION

The aforementioned problems are overcome by the present invention which provides an air treatment system having a relatively large capacity while maintaining a relatively small footprint and a relatively low sound level. The system includes a housing defining stacked, vertically extending inlet and outlet chambers. The stacked, vertically extending chambers reduce the footprint of the system. The inlet chamber houses a blower that circulates air through the system by moving air from the inlet chamber into the outlet chamber. The blower is positioned within the inlet chamber such that its inlets are facing away from the inlet grill. This reduces the sound level of the system. A foam prefilter extends over the inlet grill to remove coarse particulate matter from the entering air. The foam prefilter is easily removed for periodic washing.

The system includes a particulate filter and an odor filter that are installed within the outlet chamber. The two filters are secured within the outlet chamber by spring biased retainers that positively and firmly seat the filters within the housing to prevent air leakage. The filters are spaced away from the rear wall of the housing to define a plenum. The rear wall of the housing is curved to progressively reduce the cross-sectional area of the plenum away from the blower outlet, thereby providing uniform air pressure over the face of the filter. The system includes a large outlet opening that reduces discharge velocity and consequently the sound level of the system. The system also includes a louvered outlet grill covering the outlet opening. The outlet grill includes angled laths which hide the filter and direct the discharge stream. The outlet grill is reversible allowing the consumer to select the desired air flow direction.

The system is adapted to rest upon the floor or mount to a wall. The system includes removable feet which support the system at a reversely inclined angle to reduce the likelihood of tip over. The feet extend rearwardly a sufficient distance to prevent the system from engaging the wall. The system also includes a wall mounting bracket and receptacle that allow the system to be mounted to a wall in either a vertical or horizontal orientation.

The system also includes a control system having a high volume filtration setting that can be selectable for a specified period of time after which the system automatically returns to its prior setting. The control system also provides uniform volume air flow by increasing the blower speed as the filter becomes filled.

These and other objects, advantages, and features of the invention will be readily understood and appreciated by reference to the detailed description of the preferred embodiment and the drawings.

DETAILED DESCRIPTION OF THE PREFERRED EMBODIMENT

Figure 1:
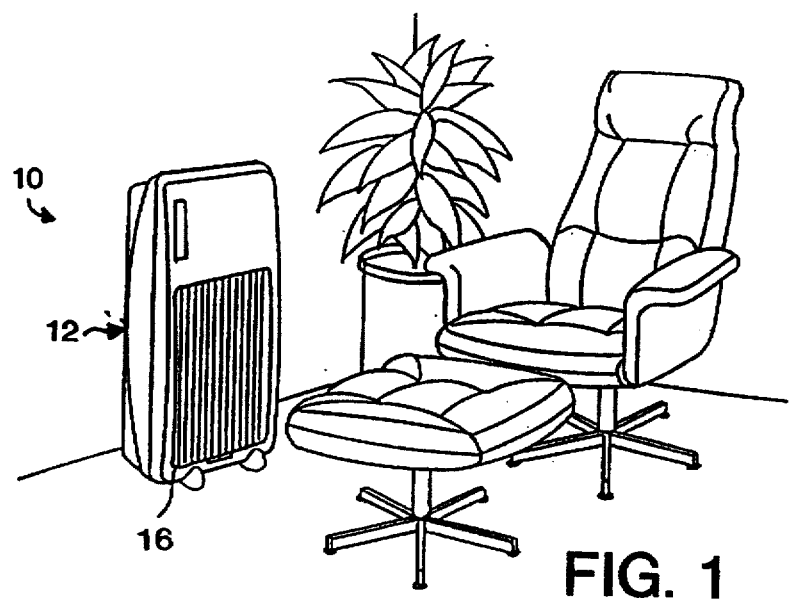
FIG. 1 is a perspective view of the air treatment system resting on the floor.

An air treatment system according to a preferred embodiment is illustrated in FIG. 1, and generally designated 10. The air treatment system 10 is shown resting upon the floor in an upright position. However, as described below, the system 10 is also adapted to mount to a wall. The air treatment system 10 includes a housing 12 having an inlet grill 14, an outlet grill 16, and a blower 18 (See FIGS. 1–3). The blower 18 circulates external air through the housing 12 by drawing it in through the inlet grill 14 and forcing it out through the outlet grill 16. A prefilter 20, particulate filter 22, and odor filter 24 are positioned along the air flow path to treat the air as it is moved through the housing 12. The system 10 is operated by an electronic control system 122.

Figure 9:
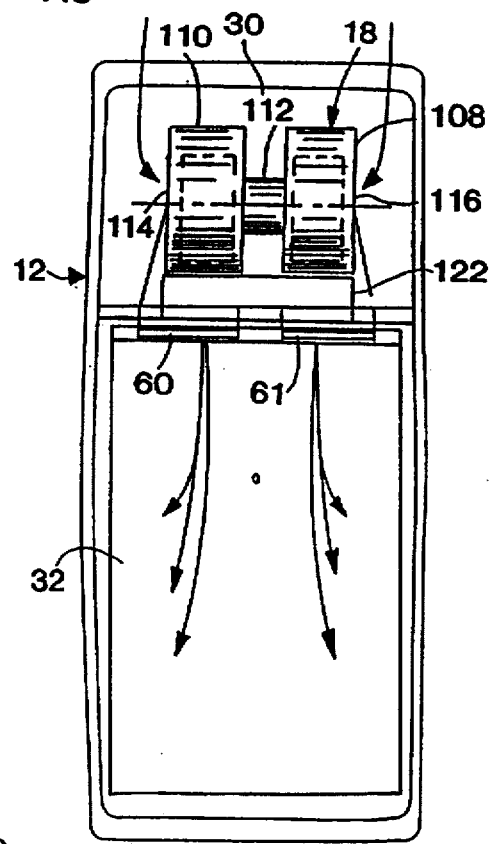
FIG. 9 is a sectional view of the air treatment system taken along line IX—IX of FIG. 8.
Figure 8:
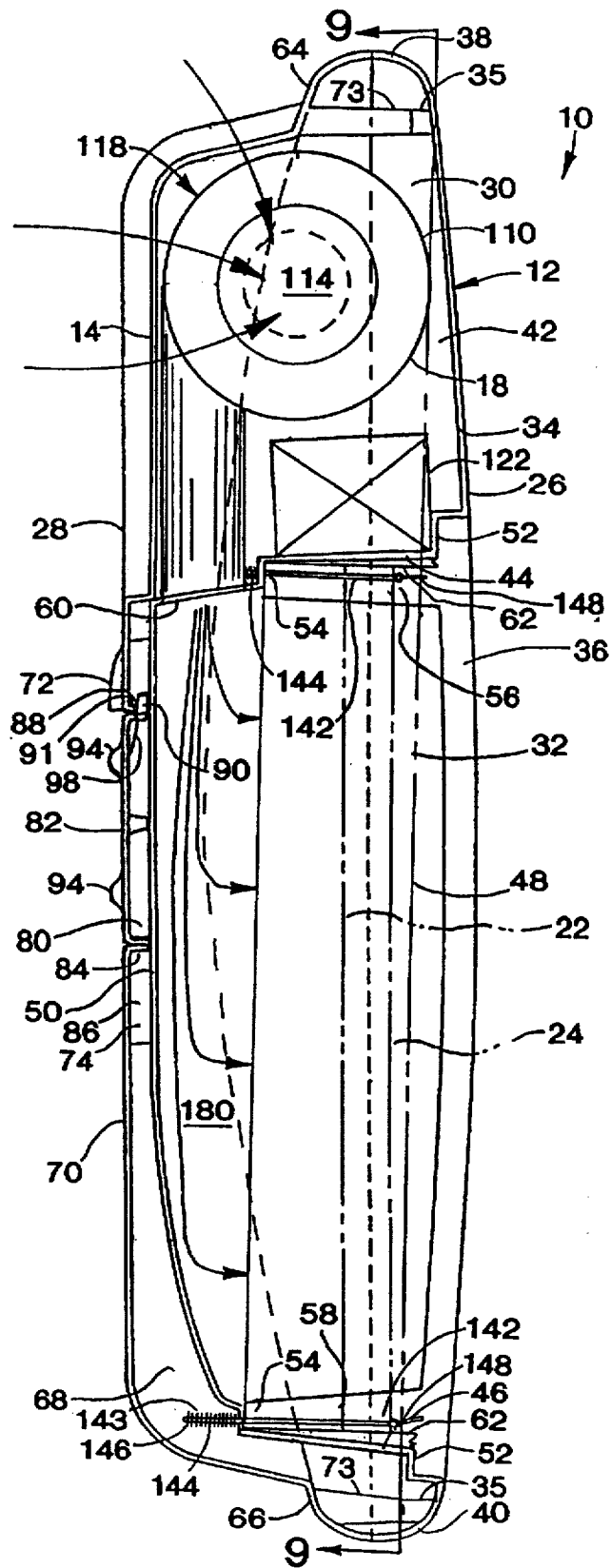
FIG. 8 is a sectional side elevational view of the air treatment system.

The housing 12 includes front and rear halves 26 and 28, respectively. As perhaps best illustrated in FIGS. 8 and 9, the housing 12 defines stacked inlet and outlet chambers 30 and 32. The inlet chamber 30 is located at the top of the system and is cooperatively defined by the top portions of the front and rear halves 26 and 28. The outlet chamber 32 is positioned below the inlet chamber 30 and is defined primarily by the front half 26. The front half 26 of the housing 12 includes a gently curved front wall 34 that defines a large, generally rectangular outlet opening 36 and a smaller, generally rectangular panel opening 192. A plurality of screw bosses 35 extend rearwardly from the front wall 34 for intersecuring the two housing halves. The front half 26 also includes top 38, bottom 40, and opposed side walls 42 that extend rearwardly from the peripheral edges of the front wall 34 to mate with the rear half 28. The front half 26 further includes a top chamber wall 44, a bottom chamber wall 46, opposed side chamber walls 48, and a rear chamber wall 50. Together, these chamber walls define the outlet chamber 32. The top 44, bottom 46, and side 48 chamber walls extend rearwardly from the front wall 34 along the periphery of outlet opening 36, and are stepped to provide a first bearing surface 52 for engaging the outlet grill 16 and a second bearing surface 54 for engaging the particulate filter 22. The top chamber wall 44 also defines a pair of generally rectangular blower openings 60, 61. These openings 60 allow the blower 18 to blow air into the outlet chamber 32. The top 44 and bottom 46 chamber walls each include a pair of retainer catches 62 to hold the retainers 142 in the release position as described below. The catches 62 also guide and support the filters 22 and 24. The side walls 48 define top 56 and bottom 58 recesses which receive the retainers 142. The rear chamber wall 50 is curved to control the flow of air in the outlet chamber and provide uniform air pressure over the face of the filters 22 and 24.

Figure 5:
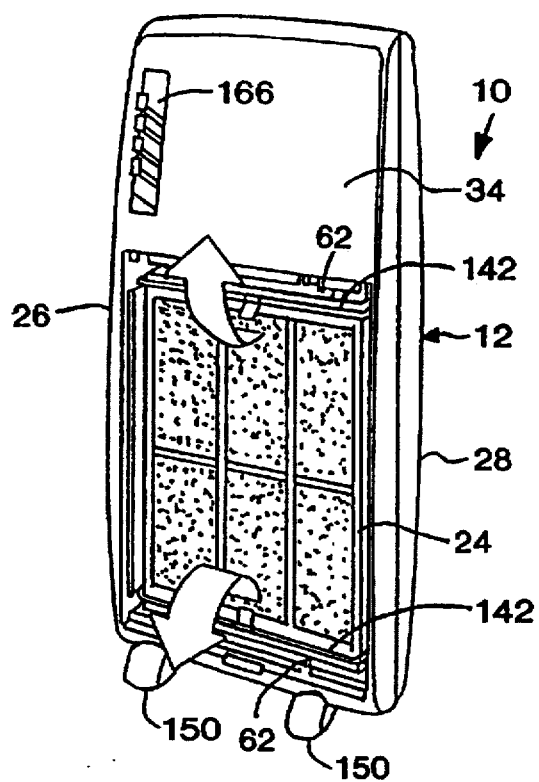
FIG. 5 is a perspective view of the air treatment system with the outlet grill removed and the retainer in the secure position.
Figure 6:
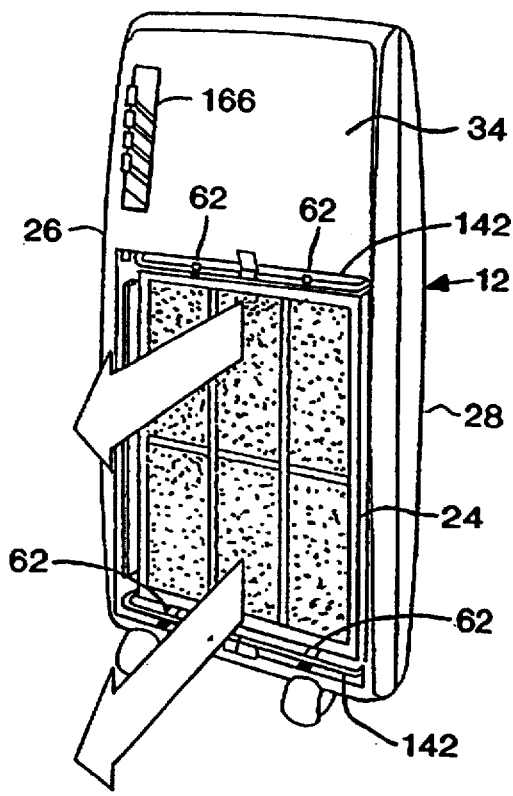
FIG. 6 is a perspective view of the air treatment system with the outlet grill removed and the retainer in the release position.
Figure 7:
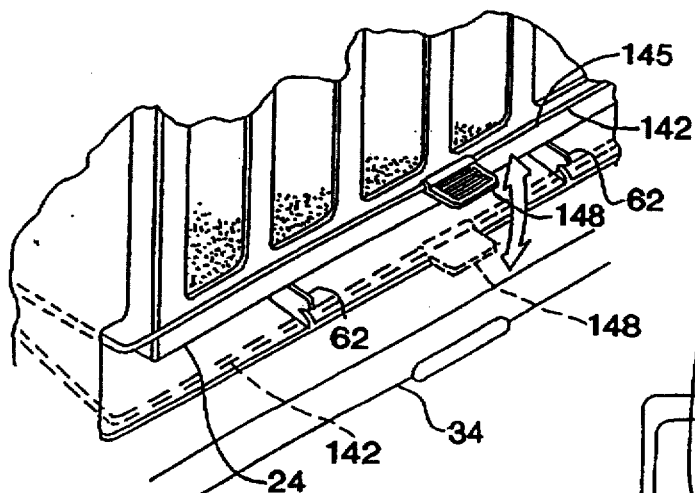
FIG. 7 is an enlarged perspective view of a portion of the air treatment system with the outlet grill removed and the retainer in the secure position.

The retainers 142 are mounted to the front half 26 within outlet chamber 32 for positively and firmly securing the particulate 22 and odor 24 filters. Each retainer 142 is movable between a securing position in which the retainer 142 engages and positively secures the filters 22 and 24 (See FIG. 5), and a release position in which the retainer 142 is hooked onto catch 62 to allow removal of an old filter and installation of a new one (See FIG. 6). In FIG. 7, the lower retainer 142 is shown in the securing position in solid lines and in the release position in broken lines. Each retainer 142 is a generally U-shaped wire having free ends 143 that extend through bearing surface 54 and a cross member 145 that engages the odor filter 24. A spring 144 is fitted over each free end 143 and secured in place by a snap ring 146. The springs bias the retainer 142 toward the rear of the system 10. A thumb tab 148 is attached to the center of each cross member 145 making it easier to move the retainer 142 between the securing and release positions.

Panel bracket 190 is mounted to the rear of front wall 34 behind panel opening 192. The panel bracket 190 is generally rectangular and functions to support the components of the control panel, including control buttons 166, LEDs (not shown), and infrared receiver (not shown). The panel bracket 190 is molded from a conventional filtering material used with conventional infrared systems. This allows the panel bracket 190 to function as a filtering lens for the infrared receiver.

Figure 10:
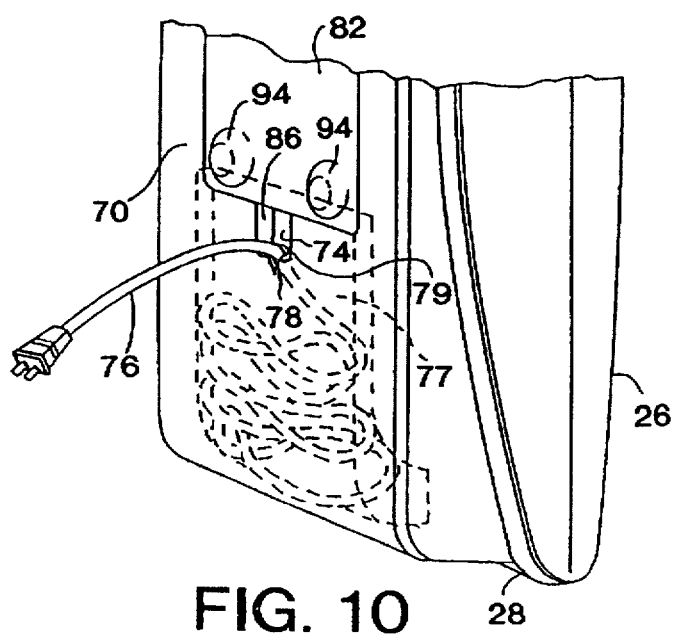
FIG. 10 is a perspective view of a portion of rear of the air treatment system showing the cord storage compartment.
Figure 13:
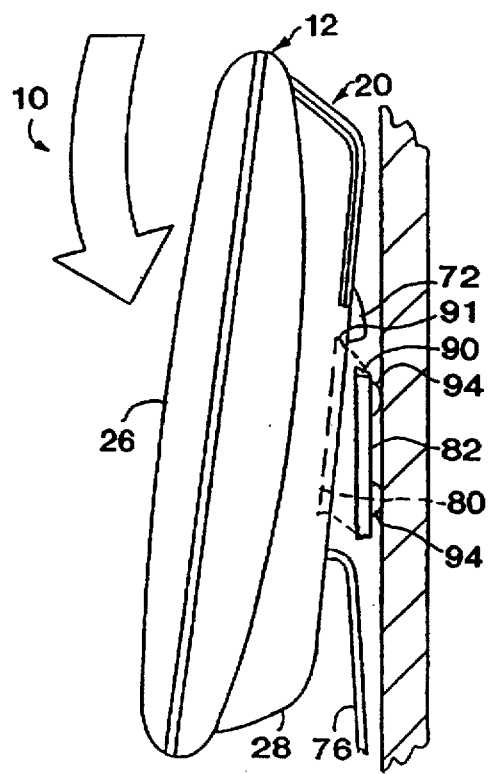
FIG. 13 is a side elevational view showing the air treatment system being installed in a vertical position.
Figure 14:
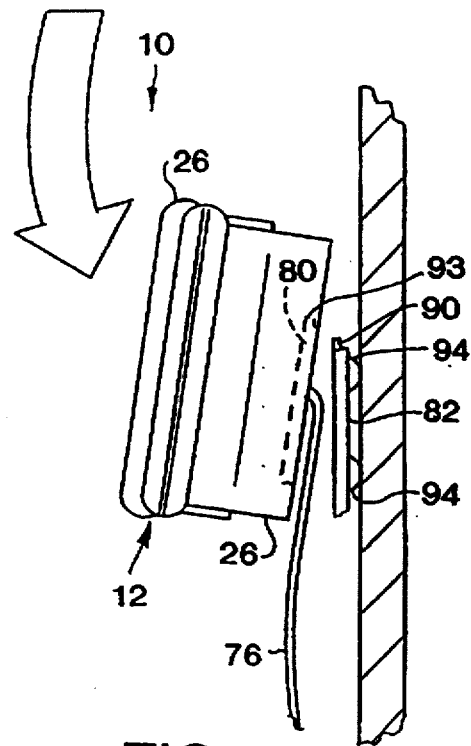
FIG. 14 is a side elevational view showing the air treatment system being installed in a horizontal position.

The rear half 28 of the housing 12 includes top 64, bottom 66, rear 70, and opposed side 68 walls. The top 64, bottom 66, and side 68 walls extend forwardly from the peripheral edges of the rear wall 70 and are shaped to mate with the corresponding walls of the front half 26. The rear wall 70 is generally planar and defines a centrally located, mounting bracket opening 80. This opening 80 is generally square and is surrounded by a peripheral wall 84 that extends toward and engages the rear chamber wall 50 of the front half 26. The peripheral wall 84 defines a pair of recesses 88 in its top 91 and left side 93 sections. The recesses 88 is the top section 91 are adapted to received the mounting bracket flanges 90 when the system is mounted vertically (See FIGS. 11 and 13) while the recesses 88 in the right side section 93 are adapted to receive the flanges 90 when the system 10 is mounted horizontally (See FIGS. 12 and 14). The rear wall 70 also defines a cord recess 74 (See FIGS. 2 and 10) surrounded by a peripheral wall 86. The peripheral wall 86 extends toward and engages the front half 26. As perhaps best illustrated in FIG. 10, the power cord 76 is stored in a storage compartment 77 defined between the front 26 and rear 28 halves. The cord recess 74 is positioned at the top of the cord storage compartment 77 and defines a cord opening 79 through which the cord passes out of the housing 12 and a V-shaped notch 78 into which the cord 76 can be wedged to hold it in place. The rear wall 70 includes a curved, protruding handle 72 defining an open bottom (not shown) into which the user's fingers can be placed to lift the system 10. The rear wall also includes a plurality of forwardly extending screw bosses 73 that mate with screw bosses 35 for intersecuring the front and rear halves.

Figure 2:
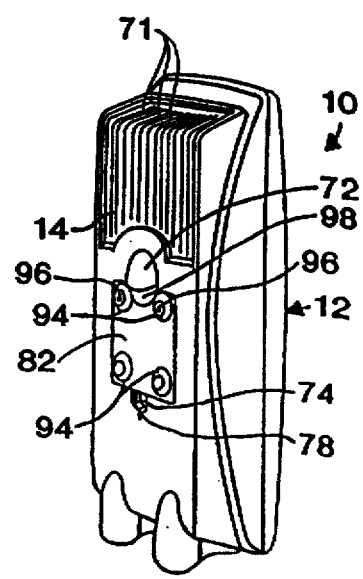
FIG. 2 is a perspective view of the rear of the air treatment system with the prefilter removed.

The top 64 and rear 70 walls cooperate to define a recessed inlet grill 14 having a series of openings for allowing air to enter the inlet chamber 30 (See FIG. 2). The inlet grill 14 extends around the back and top of the system to allow adequate air intake even when the system 10 is situated against a wall. A mounting slot (not shown) is defined at the upper end of the inlet grill 14 to receive the prefilter mounting tab (not shown) as described below.

The mounting bracket 82 is generally square and is adapted to fit within mounting bracket opening 80. The bracket 82 includes a screw boss 92 for securing the bracket 82 to the housing 12. As noted above, the bracket 82 also includes a pair of upwardly extending flanges 90. The flanges 90 are adapted to interfit with recesses. 88 in the housing 12 and firmly support the housing 12 when the system 10 is wall mounted. The bracket 82 further includes four generally spherical protrusions 94 positioned in the four corners of the bracket 82. The protrusions 94 extend rearwardly and the outermost extent of each protrusion is flat to provide increased surface area for engaging a wall. The top two protrusions 94 define screw holes 96 which allow the bracket 82 to be secured to a wall. The bracket 82 also defines an arcuate recess 98 which provides easy access to the opening (not shown) in the bottom of handle 72.

Figure 4:
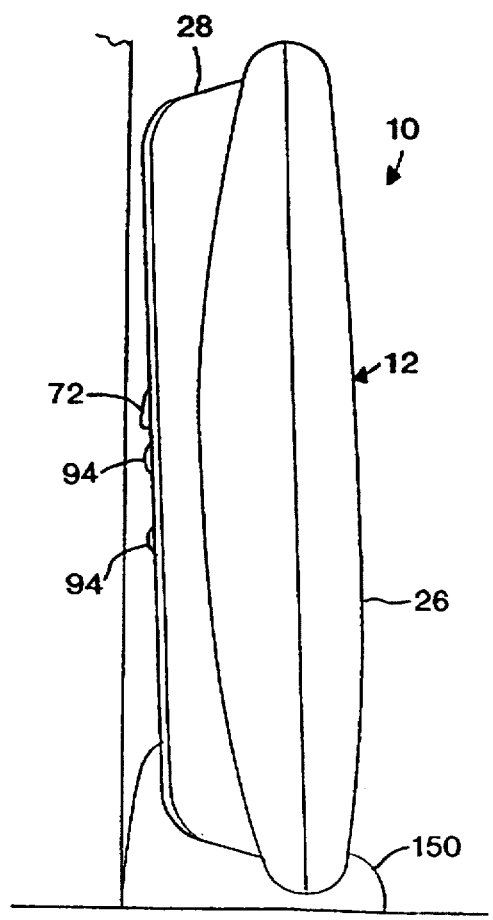
FIG. 4 is a side elevational view of the air treatment system resting on the floor.
Figure 3:
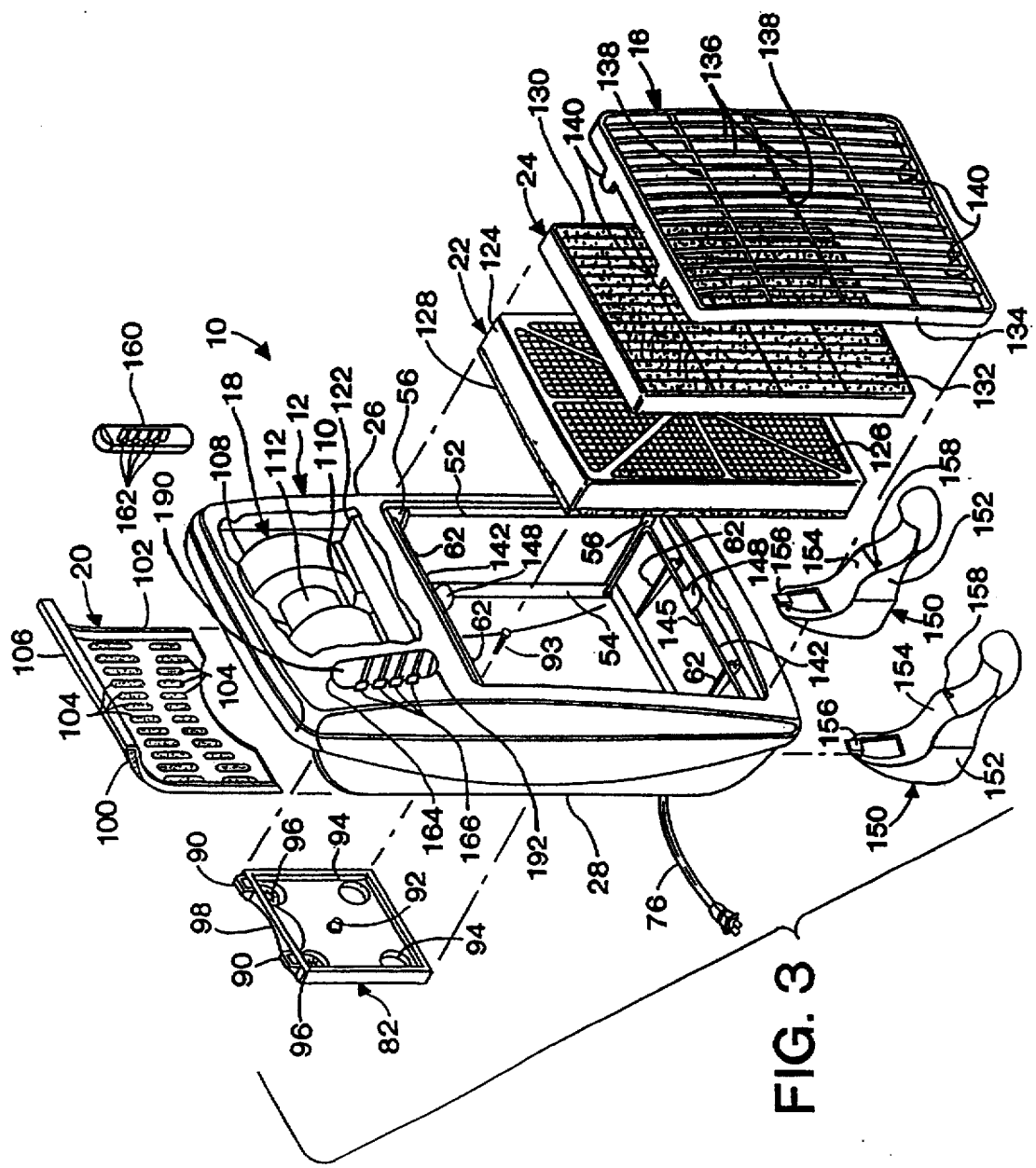
FIG. 3 is an exploded perspective view of the air treatment system with a portion removed to show the blower and control system.

The system 10 further includes a pair of feet 150 that support the housing 12 when resting upon the floor. The feet 150 are detachable so that they can be removed when wall mounting is desired. As perhaps best illustrated in FIG. 4, the feet 150 support the housing 12 at a reversely included angle to reduce the chance of the system 10 tipping over. Also, the feet 150 extend rearwardly beyond the housing 12 to prevent the housing 12 from engaging a wall. Referring now to FIG. 3, each foot 150 includes a peripheral side wall 152 forming a pedestal and a contoured top wall 154 adapted to engage the housing 12. As shown, the top wall 154 is contoured to match the shape of the bottom of the housing 12 and includes an installation flange 156. The flange 156 is adapted to fit with a slot (not shown) defined in the housing 12. Each top wall 154 also defines a screw hole 158 through which a screw (not shown) is installed to mount the foot 150 to the housing 12.

The blower 18 is mounted in the inlet chamber 30 to top chamber wall 44, and includes a pair of centrifugal blower wheels 108 and 110 mounted on opposite sides of a conventional, external control DC motor 112. The blower 18 is mounted upon conventional rubber motor mounts (not shown) to reduce the transmission of vibration from the blower to the housing 12. Each wheel 108, 110 includes a single bellmouth inlet 114, 116 facing approximately ninety degrees away from the inlet grill 14. This orientation reduces the sound level of the system 10. Each wheel 108, 110 also includes a single outlet duct 118, 120 that communicates with blower opening 60 and 61, respectively. The blower 18 is controlled by an external, electronic control system 122 as described below.

As noted above, the prefilter 20 fits over the inlet grill 14 to remove relatively coarse particles from the air as it enters the inlet chamber 30. By removing coarse particulate matter, the prefilter 20 protects the blower 18 and extends the life of the particulate filter 22 and odor filter 24. The prefilter 20 includes a layer of washable foam 100 secured to a polymeric support structure 102. The support structure 102 defines a plurality of vents 104 through which air flows as it passes into the inlet chamber 30. The vents 104 preferably extend substantially vertically in correspondence with the inlet grill openings 71. The support structure 102 includes a lip 106 extending along its upper end. The lip 106 is useful in removing the prefilter 20 from the inlet grill 14. The support structure 102 also includes a mounting tab (not shown) adapted to fit within the mounting slot (not shown) to secure the prefilter 20 in place over the inlet grill 14.

The particulate filter 22 is installed within the outlet chamber 32 to remove fine particulate matter from the air. The particulate filter 22 is seated against bearing surface 54 in spaced-relation with the rear chamber wall 70. This creates a plenum 180 between the particulate filter 22 and the rear chamber wall 70. The particulate filter 22 is generally rectangular and includes a conventional die-cut paperboard frame 124. The filtering media (not visible) is preferably a meltdown polypropylene medium. This filtering media can be replaced by electret-type, fiberglass or other conventional media. The particulate filter 22 also includes a protective cover 126, such as plastic mesh, which protects the filter media from damage. The particulate filter 22 further includes an open-cell foam gasket 128 that is secured to the rear of the filter 22 by conventional adhesives. The gasket 128 is compressed between the filter 22 and bearing surface 54 to seal the filter 22.

The odor filter 24 is seated in the outlet chamber 32 adjacent to the particulate filter 22. The odor filter 24 is generally rectangular and is substantially coextensive with the particulate filter 22. The odor filter 24 preferably includes a die-cut paperboard frame 130, an activated carbon medium (not visible), and a protective scrim 132 to prevent release of carbon dust from the filter 24. The activated carbon is preferably applied to a supportive substrate and/or is provided in a granular form contained within a honeycomb support.

The outlet grill 16 is generally rectangular and includes a peripheral frame 134 having a plurality of angled laths 136 that direct air exiting the system 10. Support ribs 138 extend between the laths to strengthen the grill 16. A pair of tabs 140 extend rearwardly from the top and bottom of the frame 134. The tabs 140 are fitted within slots (not shown) in the housing 12 to secure the outlet grill 16 in place. The tabs and slots are adapted so that the outlet grill 16 can be installed upside down thereby reversing the direction of air flow from the system 10.

Control System

As noted above, the system 10 is operated by an electronic control system 122. The control system 122 is mounted within the inlet chamber 30 upon top chamber wall 44, and includes a conventional circuit board having conventional DC motor control circuitry (not shown) that controls operation of the blower 18, conventional timing and recording circuitry (not shown) that monitors the life of the particulate and odor filters, conventional non-volatile memory (e.g. EPROM) (not shown) in which filter data in stored in the event of a power failure, and conventional input circuitry (not shown) that allows the user to select the desired operating parameters. The user operates the control system 122 by manipulation of a control panel 164 on the face of the housing 12 or a wireless remote control 160 (See FIG. 15). The control panel 164 and remote control 160 includes a plurality of control buttons 166 and 162, respectively. All information on the face of the control panel 164 is printed at an approximately forty five degree angle so that the information can be read when the system 10 is mounted either vertically or horizontally. While not illustrated, the control panel 164 also includes a plurality of motor speed LEDs that indicate the motor speed, a plurality of timer LEDs that indicate the time remaining before automatic shut off, a bicolor turbo LED that indicates when the system 10 is in turbo mode, and a plurality of filter LEDs that indicate the status of the particulate and odor filters. As noted above, the components of the control panel 164 are mounted to panel bracket 190. The control system also 122 includes a conventional infrared receiver (not shown) for receiving command signals from the infrared remote control 160 and a conventional annunciator that provides an audible response each time a control panel button 166 or remote control button 162 is depressed.

The control system 122 is capable of both manual and timed operation. With manual operation the system 10 is turned on and off manually by the touch of a power button. With timed operation, the system 10 runs for a specified period of time and then shuts off automatically. The desired time period is specified by repeatedly depressing a timer button to cycle through the various options. Timer LEDs provide a visual indication of the time remaining before automatic shut off. In the presently preferred embodiment, the control system 122 provides two, four, eight, and twelve hour time periods.

Additionally, the user can cycle through "high", "medium", and "low" motor speeds by the touch of a button. Each time the speed button is depressed, the control circuitry varies the command voltage to the motor 112 causing the motor speed to adjust accordingly. Motor speed LEDs provide a visual indication of the selected speed level of the motor.

The control system 122 also includes a "turbo" mode that operates the blower 18 at "extra-high" speed. The "turbo" mode can be operated in several different modes: (1) temporary, (2) timed, and (3) continuous. In temporary mode, the blower 18 operates at extra-high speed for a predetermined period of time, preferably thirty minutes. When the predetermined period of time is over, the system 10 reverts to its previous mode of operation. Temporary mode is selected by depressing the turbo button once. The bicolor turbo LED is turned on amber to indicate that the system 10 is in temporary turbo mode. In timed mode, the blower 18 operates at extra-high speed for a specified period of time and then the system is shut off. Timed mode is selected by depressing the turbo button once and then depressing the timer button repeatedly to select the desired time period. The bicolor turbo LED is turned on green and the appropriate timer LEDs are turned on when the system 10 is in the timed turbo mode. And finally, in continuous mode the blower 18 operates at extra-high speed continuously until the system 10 is shut off manually. Continuous mode is selected by depressing and holding the turbo button for at least three seconds. The bicolor turbo LED is turned on green and the timer LEDs are turned off to indicate that the system 10 is in the continuous turbo mode.

The control system 122 monitors the status of the particulate and odor filters and provides a visual indication when either filter needs to be replaced. The control system 122 accumulates and records (a) the length of time that each filter 22, 24 is installed in the system 10 ("filter age") and (b) the length of time that the system 10 is operating while that filter 22, 24 is installed ("filter life"). This data is maintained in separate age and life registers for each filter. The age and life data is moved to non-volatile storage in the event of a power failure. The control panel 166 includes two LEDs for each filter 22 and 24. The first LED is green turned on green when the filter does not need to be replaced. The second LED is a bicolor LED that is amber when the filter approaches (e.g. two weeks) the end of its life and blinks red when the life of the filter is exceeded. When the cumulative time of either the life or age of the filter exceeds or approaches the maximum allowable time for that filter, the appropriate filter LED is illuminated. When a filter is replaced, the corresponding age and life registers are reset by the user by pressing the appropriate reset button.

The control system 122 also includes uniform volume control circuitry that provides uniform air flow through the system 10 over the entire life cycle of the particulate filter 22. Conventionally, the volume of air flowing through the system at any given motor speed will decrease over time as the filter 22 becomes filled with particulate matter. The uniform volume control circuitry monitors filter status and automatically increases blower speed to compensate for this effect. Various apparatus and techniques can be used for monitoring filter status. First, the system 10 can determine filter status solely on the time that the filter 22 has been in use in the system (i.e. filter life). Second, the system 10 can include a conventional pressure sensor for sensing variations in pressure within the plenum. As the filter becomes clogged, the pressure within the plenum at any given command voltage will increase. Third, the system 10 can include conventional current sensing apparatus for sensing the current draw of the blower motor. As the filter becomes clogged, the blower moves less air and therefore its load decreases. The decreased load decreases the current draw of the motor at any given command voltage. Fourth, the system can include a conventional rotations-per-minute (RPMs) gauge for determining the RPMs of the motor. As the filter becomes clogged, the blower moves less air and its RPMs increase at any given command voltage. And fifth, the system 10 can include conventional air flow speed sensing apparatus for determining the speed of air flowing through the system. As the filter becomes clogged, the air flow speed will decrease at any given command voltage.

Figure 15:
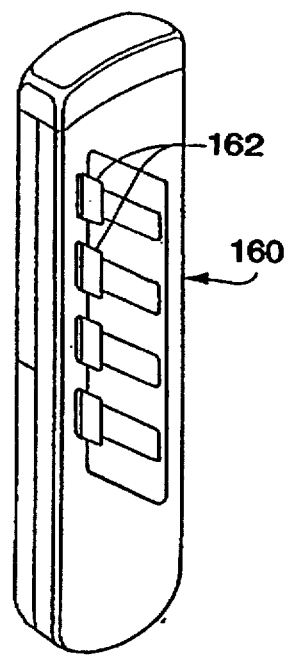
FIG. 15 is a perspective view of the remote control.

As noted above, the system 10 also includes a battery-operated, infrared remote control 160 allowing remote operation. The remote control 160 is generally conventional and, as illustrated in FIG. 15, includes a plurality of control buttons 162 that allow full operation of the system 10. The design and layout of the remote control 160 preferably matches that of the control pad 164 so that the user is not required to learn two different layouts. A conventional infrared receiver (not shown) is located in the control panel 164 for receiving control signals from the remote control 160.

Assembly and Installation

The system 10 is manufactured and assembled using conventional techniques and apparatus. The front half 26, rear half 28, outlet grill 16, mounting bracket 82, and feet 150 are injection molded from a polymeric material. The panel bracket 190 is molded from any of a number of conventional material that are transparent only to infrared light waves. The blower 18, control circuitry 122, retainers 142, panel bracket 190, and control panel components are manufactured and mounted to the front half 26 before the two halves are intersecured. Once these components are installed, the front and rear halves 26 and 28 are intersecured by screws (not shown) extending through screw bosses 35 and 73. Additionally, the rear chamber wall 50 can be secured to rear wall 70 by a plurality of screws (not shown) to strengthen the housing 12 and provide the rigidity necessary for wall mounting. The wall mounting bracket 82 is installed within the mounting bracket opening 80 by a screw 93 that extends through the rear chamber wall 50 into screw boss 92.

Figure 11:
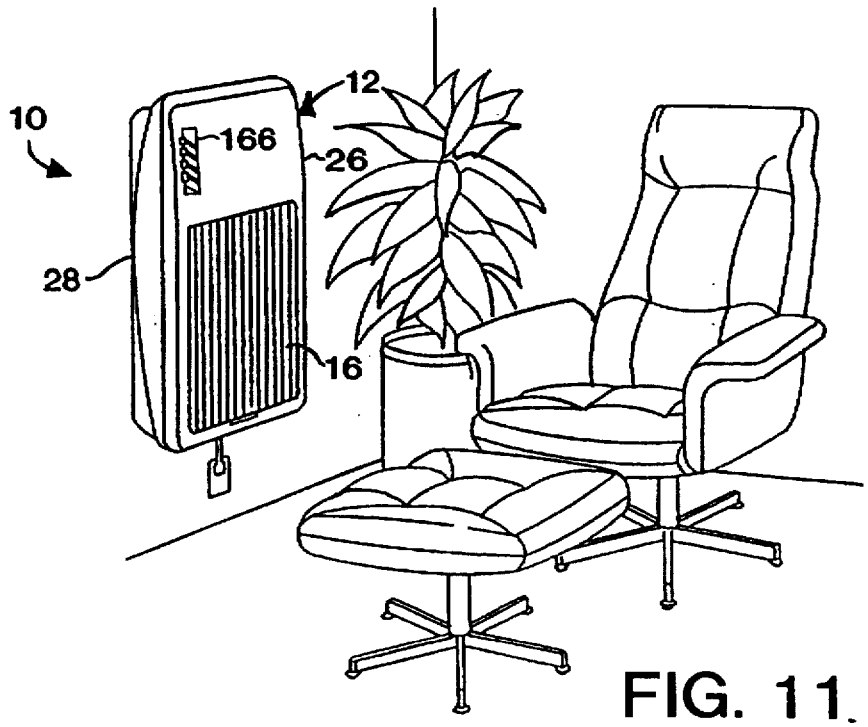
FIG. 11 is a perspective view of the air treatment system mounted to the wall in a vertical position.
Figure 12:
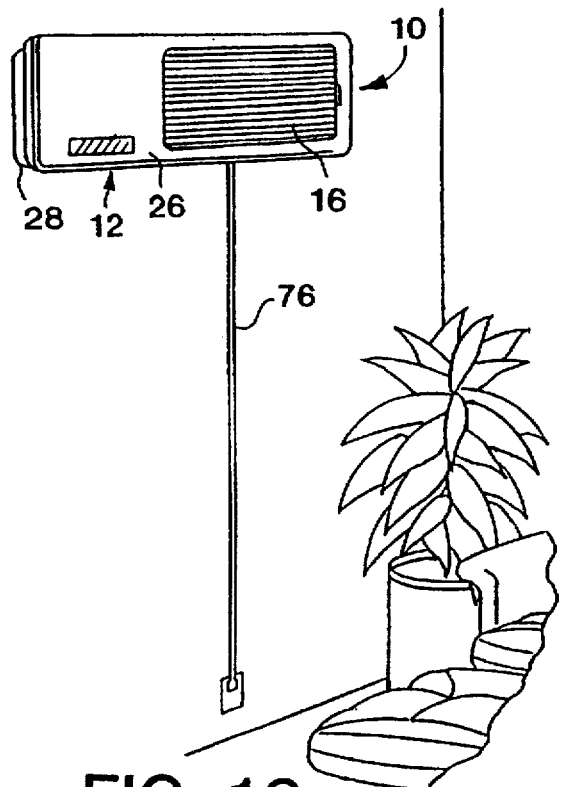
FIG. 12 is a perspective view of the air treatment system mounted to the wall in a horizontal position.

The system 10 can rest upon the floor (See FIG. 1) or mount to a wall (See FIGS. 11 and 12). If the system is intended to rest on the floor, feet 150 are mounted to the bottom of the housing 12. The feet 150 are installed by inserting tabs 156 into corresponding slots (not shown) in the rear half 28 of the housing 12 and then installing screws (not shown) through screw holes 158 into corresponding screw bosses (not shown) in the rear half 28 of the housing 12. If the system 10 is intended for wall mounting, the feet 150 are not installed. Instead, the mounting bracket 82 is removed from the housing 12 and secured to the wall at the desired location with the flanges 90 extending upwardly. The bracket 82 is preferably secured to the wall by screws extending through screw holes 96. The housing 12 is then hung over the bracket 82 in either a horizontal (FIG. 12) or vertical (FIG. 11) orientation. To vertically mount the system 10, recesses 88 in top section 91 of the peripheral wall 84 are fitted over the flanges 90 (See FIG. 13). To horizontally mount the system 10, recesses 88 in right side section 93 of the peripheral wall 84 are fitted over the flanges 90 (See FIG. 14). The housing 12 is then secured to the bracket 82 by installing screw 93 through the rear chamber wall 50 into screw boss 92.

The various filters are manufactured using conventional techniques and apparatus. The prefilter 20 is assembled by securing a layer of open cell foam 100 to an injection molded support structure 102 using conventional adhesives. A foam gasket 128 is secured to the rear of the particulate filter 22 using conventional adhesives. The prefilter 20 is installed on the housing 12 by inserting a mounting tab (not shown) extending from the support structure 102 into a mounting slot (not shown) defined in the housing 12. The particulate filter 22 and odor filter 24 are installed by first moving the retainers 142 into the release position by hooking then onto catches 62 (See FIG. 6). Next, the particulate filter 22 is inserted into the outlet chamber 32 with the foam gasket 128 facing rearwardly. The gasket 128 will engage bearing surface 54 to provide a seal around the filter 22. The odor filter 24 is then inserted into the outlet chamber 32 against the particulate filter 22. The retainers 142 are then moved into the secure position by pulling them out from catches 62 and placing them over the top and bottom edges of the odor filter 24 (See FIG. 5). Because the retainers 142 are spring-biased toward the rear of the housing 12, then positively and firmly secure the filters 22 and 24 in place. The outlet grill 16 is then installed in the outlet opening 36 by fitting tabs 140 into corresponding slots (not shown) in the housing 12. The outlet grill 16 hides and protects the filters, and directs the air flowing from the system. The outlet grill 16 is reversible so that the user can select the direction of air flow.

The system 10 operates by circulating external air through the housing 12. The blower 18 draws air in from inlet chamber 30 through inlets 114 and 116 and expels it into outlet chamber 32 through ducts 118 and 120. As the blower 18 draws air out of the inlet chamber 30, new air enters through inlet grill 14 and prefilter 20. The prefilter 20 removes coarse particulate matter from the air. The blower 18 forces the air into the plenum 180 defined in the rear of the outlet chamber 32. The plenum 180 is defined by the rear of the outlet chamber 32 and the rear face of the particulate filter 22. Because the rear chamber wall 50 is curved, the cross-sectional area of the plenum decreases away from the blower openings 60 and 61. This provides uniform air pressure over the particulate filter 22. As the pressure builds in the plenum 180, air is forced through the particulate filter 22 and the odor filter 24. The air then flows out of the system 10 through outlet grill 16.

The control system 122 monitors the life of the particulate and odor filters. As described above, the appropriate filter LED blinks red when either filter must be replaced. Replacement of filters 22 and 24 will be described in conjunction with FIGS. 5 and 6. Initially, the outlet grill 16 is removed from the outlet opening 36. Next, the retainers 142 are moved into the release position by pulling them outwardly and swinging them away from the filter 24 as illustrated by the arrows in FIG. 5. The retainers 142 are held in the release position by catches 62. (See FIG. 6). After, the expired filter is removed from the outlet chamber 32 as illustrated by the arrows in FIG. 6. A new filter is then inserted in place of the old filter and the retainers 142 are returned to the secured position. The outlet grill 16 is reinstalled to complete the process. The age and life registers for the new filter are reset by pressing the appropriate reset button for approximately three seconds.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. An air treatment system comprising:
   a housing defining an interior space and a generally square bracket opening, said housing including a peripheral wall surrounding said bracket opening;
   a blower mounted within said space for moving air through said housing;
   a filter element mounted within said space; and
   a wall mount means for mounting said air treatment system to a wall, said wall mount means including a generally square bracket fitted closely within said bracket opening, said bracket including a flange and being mountable within said bracket opening in at least two distinct orientations approximately ninety degree apart from one another whereby said housing can be mounted to the wall in at least two distinct orientations without moving said bracket with respect to the wall, said bracket including a rear wall with a periphery and a peripheral wall extending from said rear wall entirely around said periphery, said flange extending from said peripheral wall of said bracket, said peripheral wall of said bracket extending adjacent to said peripheral wall of said housing whereby said housing is supported upon said peripheral wall of said bracket rather than said flange.

2. The air treatment system of claim 1 wherein said housing peripheral wall defines first and second recesses, said flange received within one of said first and second recesses to support said housing in one of two distinct orientations.

3. The air treatment system of claim 2 wherein said housing peripheral wall includes a top section and a side section, said first recess defined in said top section and said second recess defined in said side section.

4. The air treatment system of claim 3 wherein said bracket includes a screw boss, said bracket being secured to said housing by a fastener extending through a wall of said housing into said screw boss.

5. The air treatment system of claim 4 wherein said bracket includes a plurality of protrusions extending rearwardly from said bracket, said protrusions adapted to engage the wall upon which said air treatment system is mounted, at least one of said protrusions defining a hole adapted to receive a fastener for mounting said bracket to the wall upon which said air treatment system is mounted.

6. An air treatment system comprising:
   a housing;
   a blower mounted within said housing;
   a filter mounted within said housing; and
   a generally square wall mounting bracket including a rear wall with a periphery, a peripheral wall extending from said bracket rear wall entirely around said periphery, an upwardly extending flange extending from said bracket peripheral wall, and a mounting means for securing said bracket to a wall,
   said housing including a rear wall defining a generally square bracket opening dimensioned to fit closely over said bracket in distinct first and second orientations whereby said housing can be mounted to the wall in at least two distinct orientations without moving said wall bracket with respect to the wall, said at least two distinct orientations being spaced apart from one another about an axis extending perpendicular to the wall when said housing is mounted, said rear wall further including a peripheral wall surrounding said bracket opening, said peripheral wall of said bracket extending adjacent to said peripheral wall of said housing whereby said housing is supported upon said peripheral wall of said bracket rather than said flange.

7. The air treatment system of claim 6 wherein said peripheral wall of said housing defines first and second recesses, said first recess adapted to receive said flange when said housing is in said first orientation and said second recess adapted to receive said flange when said housing is in said second orientation.

8. The air treatment system of claim 7 wherein said peripheral wall of said housing includes a top section and a side section, said first recess defined in said top section and said second recess defined in said side section such that said first orientation and said second orientation are spaced ninety degrees from each other.

9. The air treatment system of claim 8 wherein said bracket includes a screw boss, said bracket being secured to said housing by a screw extending through said rear wall of said housing into said screw boss.

10. The air treatment system of claim 8 wherein said bracket includes a plurality of protrusions extending rearwardly from said bracket, said protrusions adapted to engage the wall upon which the air treatment system is mounted.

11. The air treatment system of claim 10 wherein at least one of said protrusions defines a hole adapted to receive a fastener for mounting said bracket to the wall upon which the air treatment system is mounted.

12. The air treatment system of claim 11 wherein said housing is orientated vertically on a wall when in the first orientation and horizontally on a wall when in the second orientation.

13. An air treatment system comprising:
a housing having a rear wall defining a generally square bracket opening said rear housing including a peripheral wall surrounding said bracket opening;
a filter contained within said housing;
a blower contained within said housing for moving air through said housing and said filter;
a generally square mounting bracket for mounting said housing to a wall, said mounting bracket fitting closely within said bracket opening and having a rear wall with a periphery a peripheral wall extending from said bracket rear wall entirely around said periphery, and a flange, said flange capable of interlocking with said housing peripheral wall in distinct first and second positions, whereby said housing is capable of being mounted to the wall in a horizontal orientation and a vertical orientation while said bracket remains in a single position with respect to the wall, said horizontal orientation and said vertical orientation being spaced approximately ninety degrees from one another about an axis extending perpendicular to the wall when said housing is mounted, said peripheral wall of said bracket extending adjacent to said peripheral wall of said housing whereby said housing is supported upon said peripheral wall of said bracket rather than said flange.

14. The air treatment system of claim 13 wherein said bracket includes a vertical flange and said housing peripheral wall defines a first recess receiving said flange when said housing is in said horizontal orientation and a second recess receiving said flange when said housing is in said vertical orientation.

15. The air treatment system of claim 14 wherein said peripheral wall of said mounting bracket extends forwardly to engage said housing.

16. The air treatment system of claim 15 wherein said mounting bracket further includes a plurality of protrusions extending rearwardly from said rear wall of said mounting bracket.

17. An air treatment system comprising:
a housing;
a filter mounted within said housing;
a blower mounted within said housing for moving air through said housing and said filter;
a control means for controlling the operation of said blower, said control means including a one-piece control panel bracket mounted to said housing for supporting a plurality of controls, said control means further including an infrared receiver mounted behind said control panel bracket for receiving control signals from an infrared remote control, said control panel bracket manufactured entirely from an infrared passing material whereby said control panel bracket functions as a filtering lens for said infrared receiver.

* * * * *